US009115788B2

(12) United States Patent
Kurematsu et al.

(10) Patent No.: US 9,115,788 B2
(45) Date of Patent: Aug. 25, 2015

(54) RING-TYPE TENSIONER

(71) Applicant: Tsubakimoto Chain Co., Osaka (JP)

(72) Inventors: Yuji Kurematsu, Osaka (JP); Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 332 days.

(21) Appl. No.: 13/855,249

(22) Filed: Apr. 2, 2013

(65) Prior Publication Data

US 2013/0281238 A1 Oct. 24, 2013

(30) Foreign Application Priority Data

Apr. 20, 2012 (JP) .................................. 2012-097064

(51) Int. Cl.
*F16H 7/08* (2006.01)

(52) U.S. Cl.
CPC ............ *F16H 7/08* (2013.01); *F16H 2007/088* (2013.01); *F16H 2007/0853* (2013.01); *F16H 2007/0859* (2013.01)

(58) Field of Classification Search
CPC ................ F16H 2007/0853; F16H 2007/0859; F16H 2007/088
USPC ........................................................ 474/101
See application file for complete search history.

(56) References Cited

U.S. PATENT DOCUMENTS

| 7,189,174 | B2 * | 3/2007 | Yamamoto et al. | ............ 474/109 |
| 7,455,607 | B2 * | 11/2008 | Narita et al. | ................... 474/109 |
| 7,527,572 | B2 * | 5/2009 | Sato et al. | ...................... 474/109 |
| 7,559,863 | B2 * | 7/2009 | Onimaru et al. | ............... 474/110 |
| 7,571,632 | B2 * | 8/2009 | Yamamoto et al. | ......... 72/370.21 |
| 7,775,921 | B2 * | 8/2010 | Izutsu et al. | ................... 474/110 |
| 7,775,923 | B2 * | 8/2010 | Sato et al. | ...................... 474/110 |
| 8,282,520 | B2 * | 10/2012 | Kurematsu et al. | ........... 474/101 |
| 2004/0266571 | A1 * | 12/2004 | Izutsu et al. | ................... 474/110 |
| 2005/0049093 | A1 * | 3/2005 | Sato et al. | ...................... 474/101 |
| 2006/0270500 | A1 * | 11/2006 | Yamamoto et al. | ........... 474/109 |
| 2007/0213152 | A1 * | 9/2007 | Yamamoto et al. | ........... 474/109 |
| 2010/0093474 | A1 * | 4/2010 | Onimaru et al. | ............... 474/110 |

FOREIGN PATENT DOCUMENTS

| JP | 40004546 U | 2/1965 |
| JP | 2001146946 | 5/2001 |
| JP | 2002005249 | 1/2002 |
| JP | 2007032685 A | 2/2007 |

* cited by examiner

*Primary Examiner* — William E Dondero
*Assistant Examiner* — Mark K Buse
(74) *Attorney, Agent, or Firm* — Howson & Howson LLP (57) ABSTRACT

In a ring-type tensioner, a resilient ring that cooperates with external grooves formed on a plunger to restrict retracting movement of the plunger in a tensioner housing, is formed with manipulation parts that extend through a cut-out portion in the housing and have bulged portions that are spaced by gaps from opposed walls of the cut-out portions. A rod-shaped tool inserted into one of the gaps cooperates with the bulged portion and the wall on opposite sides of the gap to expand the ring. The manipulation parts can be formed with tool-holding portions.

6 Claims, 9 Drawing Sheets

FIG. 1

AXIAL DIRECTION
SETBACK DIRECTION ⟵⟶ ADVANCE DIRECTION

RING-TYPE TENSIONER

CROSS REFERENCE TO RELATED APPLICATIONS

The disclosure of Japanese Patent Application No. 2012-097064, filed on Apr. 20, 2012, on which this application will claim priority, is incorporated by reference.

FIELD OF THE INVENTION

This invention relates to a tensioner for maintaining tension in an endless, flexible traveling transmission medium such as an engine timing chain, and more specifically to a ring-type tensioner having an elastic ring that engages annular grooves formed on the outer surface of a sliding plunger which protrudes from a plunger-accommodating hole in a tensioner housing.

BACKGROUND OF THE INVENTION

In a ring-type tensioner, the ring is used to effect a ratcheting action, enabling the plunger to advance, but restricting retracting movement of the plunger. An annular portion of the ring is disposed in a circumferential groove formed in the wall of the plunger-accommodating hole, and a manipulating portion of the ring typically extends outward from the housing so that the ring can be expanded by a tool in the assembly or maintenance of the tensioner.

Typical ring type tensioners are disclosed in Japanese laid-open Patent Applications 2002-5249, published on Jan. 9, 2002 and 2001-146946, published on May 29, 2001.

In the maintenance of an engine, there are occasions in which it is necessary to release the tension in the engine timing chain. If tension in the chain is maintained by a ring-type tensioner, the plunger of the tensioner can be allowed to retract by expanding the elastic ring, using an expansion tool to effect relative movement of manipulation elements that protrude from the annular portion of the ring. Often, there is little working space in the vicinity of the tensioner when installed on an engine, and it is difficult to expand the ring using a conventional expansion tool. In addition it is frequently necessary to insert the expansion tool through a small access hole in a cover of an enclosure, such as a timing chain cover.

In the tensioner of Japanese Patent Application 2002-5249, parts of the ring cross each other, and a pinching tool is used to expand the ring. Not only is it difficult to reach the manipulation elements with the pinching tool, but it is also difficult to maintain the ring in its expanded condition using the pinching tool.

When the elastic ring is the type of ring in which the manipulation elements protrude from parts of the ring that do not cross each other, as in Japanese Patent Application 2001-146946, the ring is expanded by inserting a tool between the manipulation elements. A special, dedicated, manipulation tool is required. Moreover, because the positions of the manipulation elements may change due to rotation of the ring, it can be difficult to insert a manipulation tool between the pair of manipulation elements.

In the type of the tensioner in which the elastic ring is formed with parts that cross each other and has an asymmetric shape, as in Japanese Patent Application 2002-5249 for example, it is difficult to automate the manufacture of the ring, and difficult to supply the ring using a parts feeder especially because the ring tends to become entangled with other rings.

In addition, in a ring in which the parts from which the manipulation elements extend cross each other, the manipulation pieces can bend when the manipulation elements are pinched to expand the diameter of the ring, sometimes making it difficult to expand the ring to the extent required to release the plunger.

Accordingly, there is a need for a ring-type tensioner in which the plunger can be installed more easily and efficiently in the tensioner housing, and in which the plunger can be released more easily and efficiently for maintenance, There is also a need for a ring-type tensioner in which the elastic ring can be installed more easily and efficiently into the tensioner housing.

SUMMARY OF THE INVENTION

The ring-type tensioner of the invention comprises a housing having an end surface and a plunger-accommodating hole with an opening in said end surface, the plunger-accommodating hole having a longitudinal axis, A plunger protrudes from the plunger-accommodating hole and is slidable along the axis both in a protruding direction and in a retracting direction opposite to the protruding direction, so that the plunger can maintain tension in an endless flexible transmission medium in a transmission. The tensioner includes means for biasing the plunger in the protruding direction, and a circumferential ring-accommodating groove in a wall of the plunger-accommodating hole. A cut-out portion formed in the housing extends axially from the end surface to the ring-accommodating groove. The cut-out portion has opposed, circumferentially facing, wall surfaces. An elastic ring is disposed in the ring-accommodating groove and the cut-out portion and surrounds the plunger. The elastic ring has an annular portion disposed in the ring-accommodating groove, and a manipulating portion continuous with the annular portion and disposed at least in part in the cut-out portion. The manipulating portion is operable by a manipulation tool to expand or contract the annular portion. The plunger has a set of external circumferential grooves, each being engageable by the annular portion of the elastic ring to restrict axial movement of the plunger. The manipulating portion of the ring is composed of manipulation elements with counterface portions that are disposed respectively in facing relationship with, and spaced from opposed circumferentially facing wall surfaces of the cut-out portion so that a gap is formed between each said wall surface and a counterface portion of one of the manipulation elements. The ring is configured so that, when the gaps are enlarged, the annular portion can expand to a condition in which its internal diameter is larger than the maximum diameter of the external circumferential grooves of the plunger whereby the annular portion clears the external circumferential grooves thereby releasing the plunger for axial movement in the retracting direction. At least one of each counterface portion and its opposed wall portion has a bulged part, and the bulged parts are shaped such that, proceeding in an inward direction toward the plunger, each bulged part gradually bulges in the circumferential direction whereby a manipulation tool that is moved inward into one of the gaps toward the plunger while in contact with a bulged part moves the counterface portion of a manipulation element in a direction to cause the annular portion of said ring to expand.

With above-described arrangement, a manipulation tool is simply inserted into a gap formed between the counterface portion of a manipulation part and a wall surface of the cutout portion and then moved inward between the bulged portion and the part on the opposite side of the gap to expand the annular part of the ring.

It is not necessary to pinch the manipulating portion by means of a pinching tool, and no special tool is not necessary for insertion insert between a of manipulation pieces. Assembly of the tensioner and releasing chain tension for maintenance of engine parts and the like are made much easier.

In the tensioner each of the manipulation elements can include a portion extending outward through the opening in the end surface of the housing. The outward extending portion can be used to guide a manipulation tool toward a bulged part in one of the gaps.

With this arrangement, a manipulation tool can be inserted more easily and reliably between a bulged part and a wall surface of the cut-out portion even if the widths of the gaps at the outer ends thereof are larger than the width of the manipulation tool.

In another aspect of the invention, the bulged parts are formed in the manipulation elements, and the wall surfaces of the cut-out in the housing have concave portions which the bulged parts can enter when the annular portion is contracted to a condition in which it clears the ring-accommodating groove.

With this arrangement, it is easy to install an elastic ring having bulged parts into the tensioner housing without inclining the ring. In addition, because it is not necessary to increase the circumferential size of the cutout portion, it is possible to prevent the circumference of the ring accommodating groove from being reduced due to enlargement of the cutout portion. Accordingly, it is possible to block movement of the annular portion reliably by contact with between the ring and the ring-accommodating groove.

In still another aspect of the invention, the manipulation portion is composed of first and second manipulation elements, and the bulged portions are formed respectively in the first and second manipulation elements. The first and second manipulation elements have first and second straight portions that connect the annular portion of the ring with the bulged parts, said straight portions extending in tangential relation to the circumferential direction of the annular portion. The first and second straight portions are in substantially parallel relationship, in contact with each other, and in overlapping relationship when viewed in a direction parallel to the axis of the plunger and the plunger-accommodating hole. The first and second straight portions can slide relative to each other when the manipulation elements are moved in a direction to expand the annular portion of the ring.

The term "substantially," when used herein as a modifier, is intended to signify that the word or expression so modified encompasses a range in which there is no significant difference insofar as operation and effect are concerned.

With the above-described arrangement, the straight condition of the first and second straight portions is maintained, and deflection at the overlapping portions is prevented even when the bent portions of the manipulation parts are pinched toward each other by a pinching tool.

In still another aspect of the invention, the manipulation elements are formed into a shape having substantially rotational symmetry when rotated through 180° about a straight line. The rotational symmetry makes it becomes easy to supply the elastic rings with a part feeder, and it becomes possible to automate the installation of the elastic ring into the ring-accommodating groove of the tensioner housing.

In still another aspect of the invention, the wall surfaces of the cut-out portion of the housing have inclined surfaces adjacent opening of the cut-out portion, whereby the circumferential width of the cut-out becomes greater proceeding outward from the interior thereof toward its opening.

The enlarged opening of the cut-out portion facilitates the insertion of the manipulation tool especially when the manipulation tool is inserted through a small maintenance hole. The inclined wall surface acts as a guide for bringing the manipulation tool into contact with outward extending portions of the manipulation elements.

In still another aspect of the invention, the manipulation elements have holding portions for holding a manipulation tool by engaging the manipulation tool when the tool is inserted into the gaps.

With this arrangement, after the annular portion of the ring is expanded, the manipulation tool can be held by the manipulation elements, so that an operator is not required to hold the manipulation tool continuously to keep the ring in its expanded condition. Moreover because the holding portions are provided in the manipulation elements, the manipulation tool can be held stably by the receiving portion even while the manipulation elements move.

Further features of the invention will become apparent from the following description of exemplary embodiments with reference to the attached drawings.

DETAILED DESCRIPTION OF THE PREFERRED EMBODIMENTS

Figure 1:
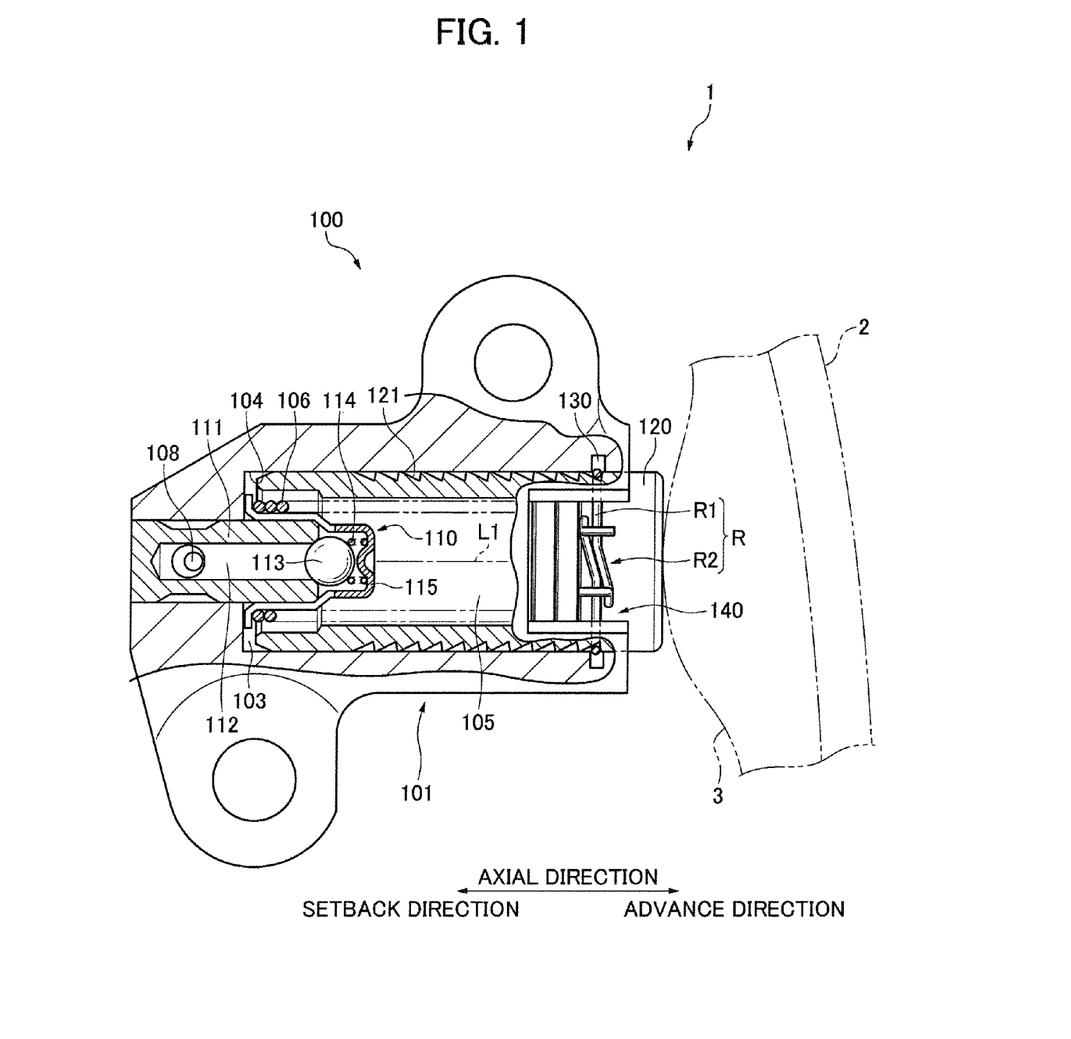
FIG. 1 side elevation, partly in section taken on surface I-I in FIG. 3, of a ring-type tensioner according to the invention, showing the tensioner plunger in contact with a pivoted tensioner lever.

FIG. 1 shows a ring-type tensioner 100 provided in the timing chain transmission 1 of an automobile engine (not shown). The timing chain transmission 1 comprises various elements not shown, including sprockets on an engine crankshaft and camshafts, and an endless timing chain 2 in driven and driving engagement with the respective sprockets, and a pivoted tensioner lever or guide 3, on which the chain 2 slides and through which the tensioner exerts tension the chain.

Figure 2:
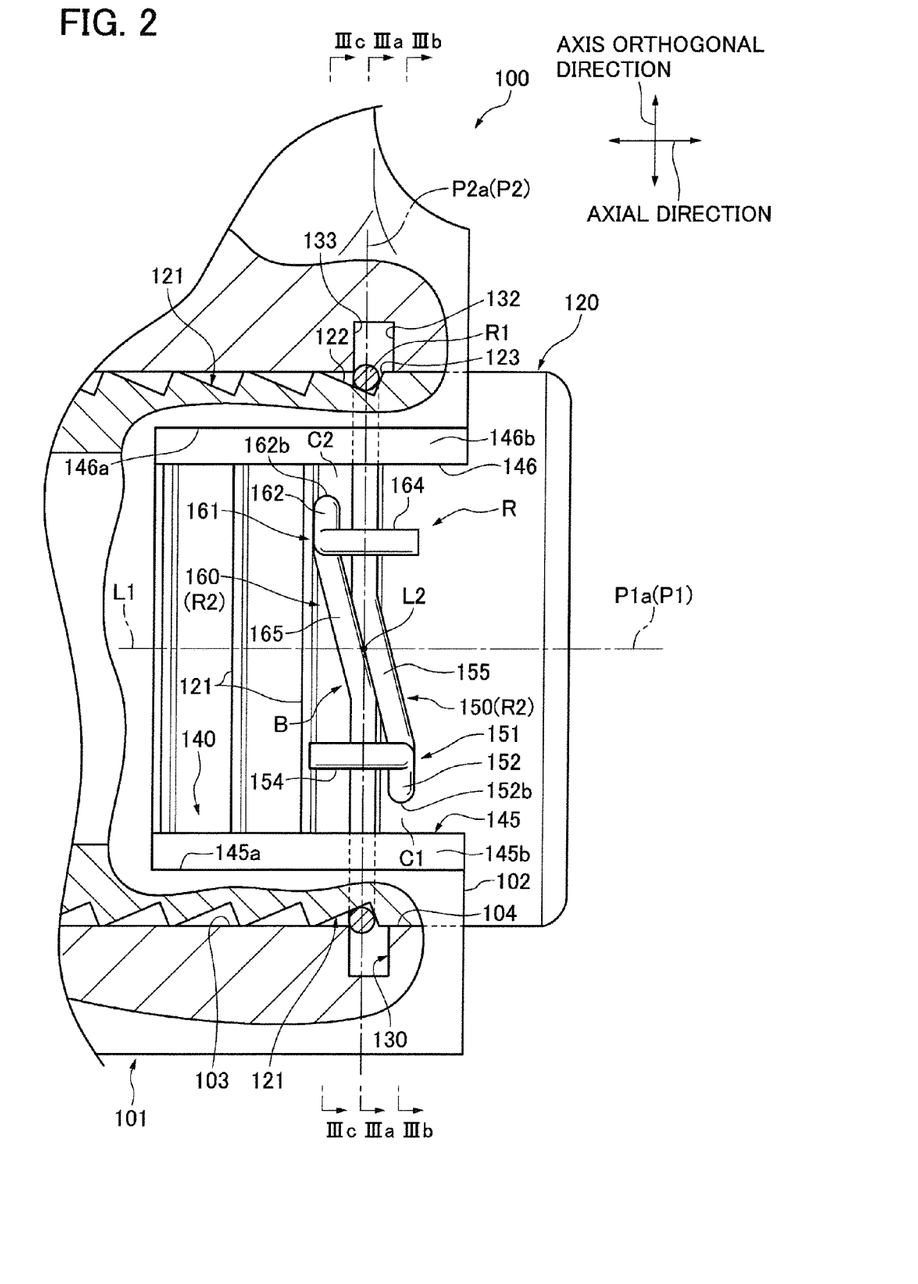
FIG. 2 is an enlarged view of the end of the tensioner in FIG. 1 from which the plunger protrudes.

As shown in FIGS. 1 and 2, the tensioner 100 includes a housing 101 having an oil supply passage 108 and a plunger-accommodating hole 103. A plunger 120 protrudes from the plunger-accommodating hole and is slidable therein along an axial line L1. An elastic ring R is disposed circumferentially around the plunger 120, and is capable of expanding and contracting radially by elastic deformation. An oil chamber 105 is formed by the housing 101 and the plunger 120 within the plunger-accommodating hole 103. A plunger-biasing spring 106 is disposed within the oil chamber 105 for urging the plunger in the protruding direction, and a check valve 110 is disposed within the plunger-accommodating hole 103 for allowing flow of oil from an engine oil pump through passage 108 into the chamber 105, but preventing reverse flow of oil.

The check valve 110 has a ball seat 111 with an oil passage 112 that communicates with the oil supply passage 108, and a check ball 113 that seats on the ball seat 111. The check ball is biased against the ball seat by a spring 114. A retainer 115 supports the valve spring 114 and limits the stroke of the check ball 113.

Figure 3:
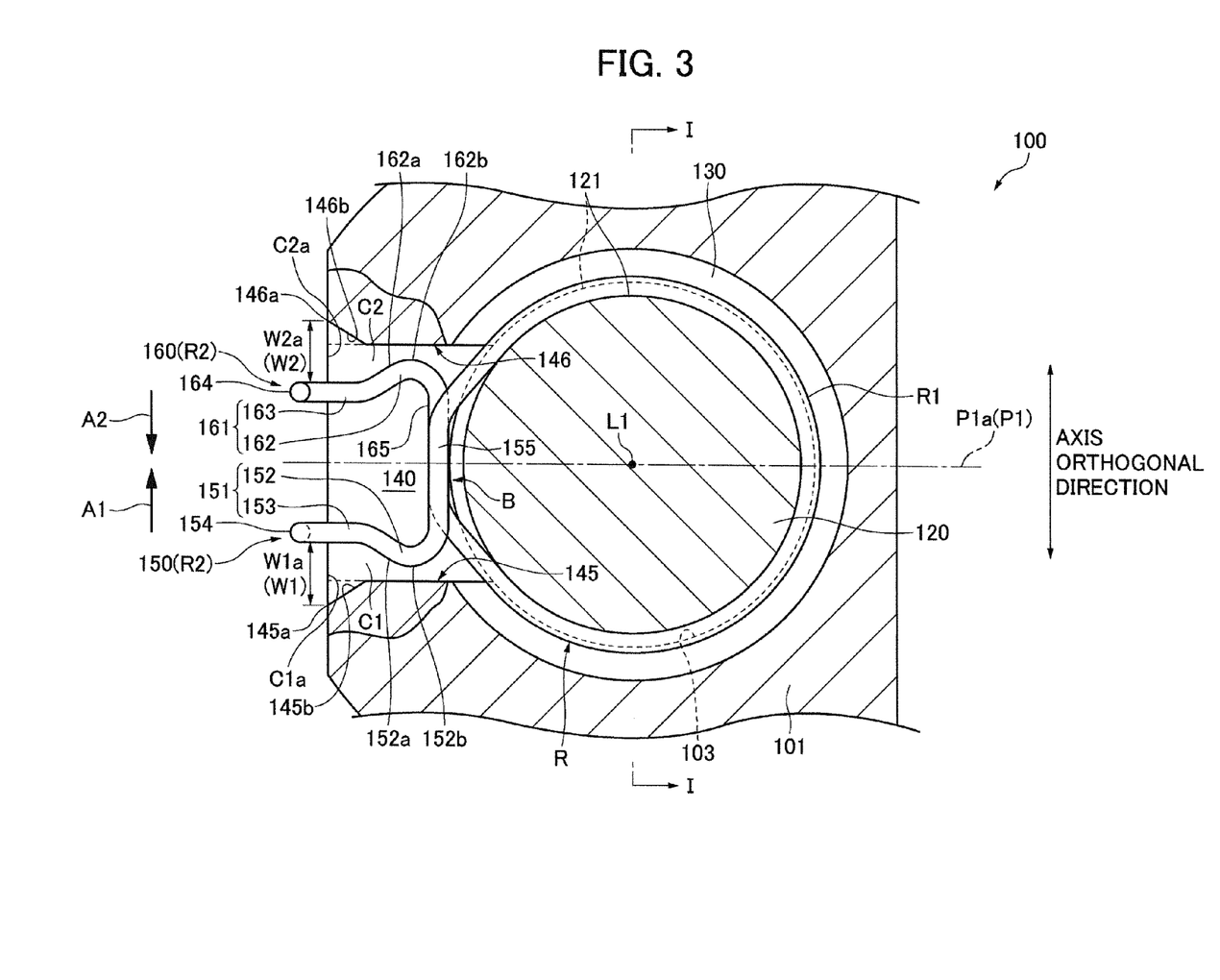
FIG. 3 is a sectional view taken on section plane IIIa-IIIa and partially on section planes IIIb-IIIb and III-IIIc in FIG. 2.

As shown in FIGS. 1 through 3, the plunger 120 is formed with a plurality of annular circumferential grooves 121 having a sawtooth-shaped cross-sectional shape in axial plane P1 (FIG. 2) in which the axis L1 of the plunger-accommodating hole lies. Each of these grooves 121 has an inclined surface 122 facing in the direction of advancing movement of the plunger and an inclined surface 123 facing in the retracting direction of the plunger. These surfaces 122 and 123 are engageable with a portion R1 of an elastic ring R.

The housing 101 is formed with an annular ring-accommodating groove 130 in the wall 104 of the plunger-accommodating hole 103. This groove extends circumferentially around the axis L1 of the plunger-accommodating hole 103. The plunger-accommodating hole is also formed with a cut-out portion 140 that extends axially from end surface 102 of the housing and intersects the ring-accommodating groove 130. The ring-accommodating groove 130 and the cut-out portion 140 are open radially to the plunger-accommodating hole 103. The elastic ring R is accommodated by the ring-accommodating groove 130 and the cut-out portion 140.

The elastic ring R is in the form of a resilient wire having an annular portion R1 surrounding the plunger 120 circumferentially, and a manipulating portion R2, consisting of two elements 150 and 160, which are continuous with the annular portion R1 at opposite ends thereof. The manipulating portion is disposed in the cut-out portion 140 and can be manipulated by a manipulation tool T (FIG. 4) to expand or contract the annular portion R1 radially.

As shown in FIG. 2, when the ring is engaged with a groove 121 on the plunger, the outer diameter of the annular portion R1 is larger than the diameter of the plunger-accommodating hole 103, and the annular portion R1 is disposed in part in the ring-accommodating groove 130 and in part in groove 121 in the radial direction. The inner diameter of the annular portion R1 is smaller than the diameter of the plunger-accommodating hole 103 and also smaller than the maximum outer diameter of the groove 121.

Figure 4:
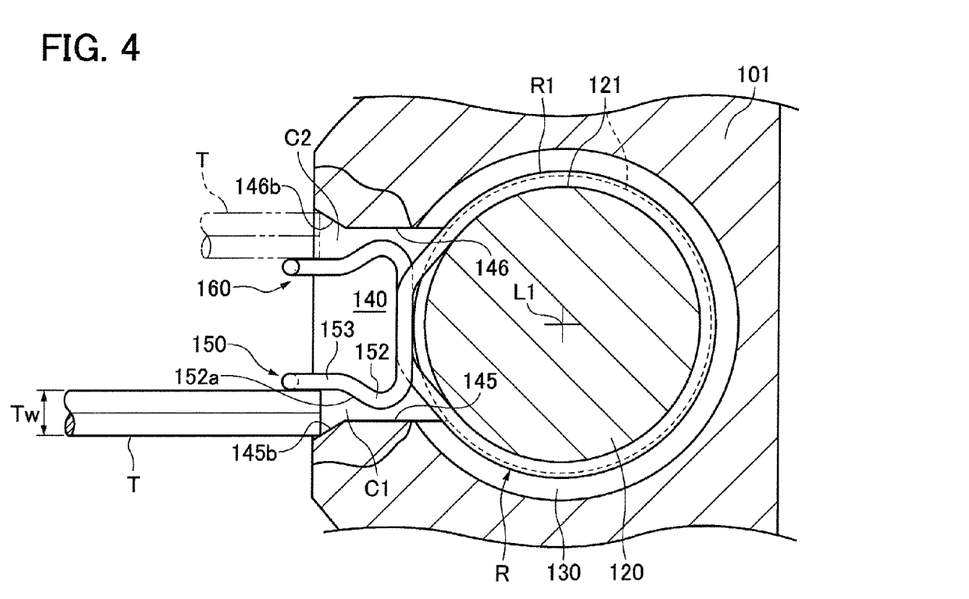
FIG. 4 is a sectional view, corresponding to FIG. 3, illustrating a stage in the process of expansion of the diameter of the elastic ring in the tensioner.
Figure 5:
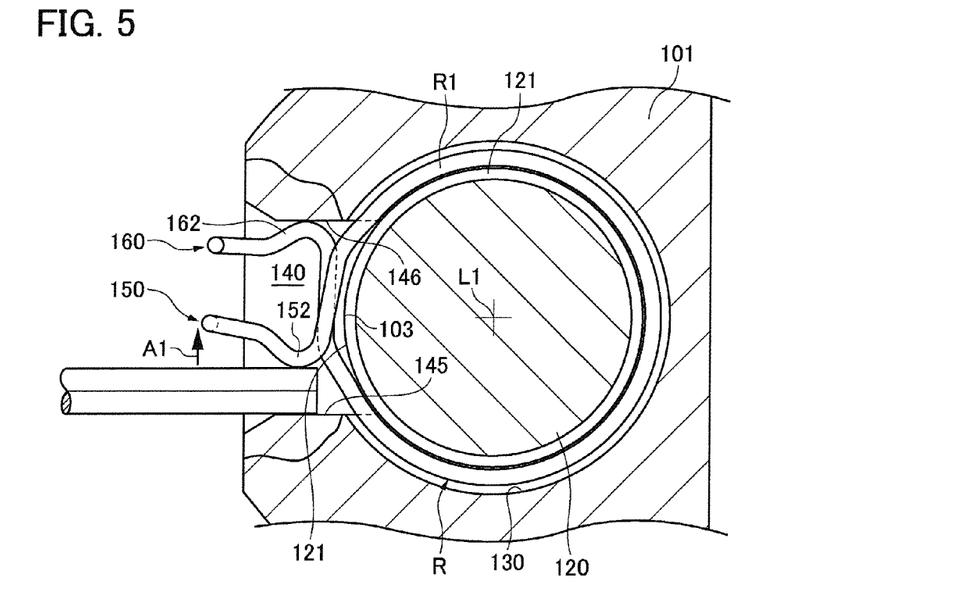
FIG. 5 is a sectional view, corresponding to FIG. 3, illustrating later stage in the process of expansion of the diameter of the elastic ring, in which the ring is fully expanded.

As shown in FIGS. 4 and 5, the manipulation tool T is a rod-shaped member. It can be an ordinary, commonly available, tool such as a hexagonal wrench.

As shown in FIGS. 2 and 3, the advancing and retracting movements of the plunger 120 are permitted or restricted depending on the condition of engagement of a groove 121 on the plunger with the annular portion R1. More specifically, the ring-accommodating groove 130 has a contact portion 132 facing in the retracting direction and contact portion 133 facing in the advancing direction. These contact portions 132 and 133 respectively block advancing and retracting movement of the annular portion R1 within the ring-accommodating groove 130 by coming into contact with the annular portion R1.

When tension in chain 2 is reduced and the force exerted in the plunger-advancing direction by the biasing spring and oil pressure is large, groove surface 122, which has a gradual slope, causes the annular portion R1 to expand and the annular portion R1 rides radially outward on surface 122 as the ring expands. If the force urging the plunger in the advancing direction is sufficiently large, the annular portion R1 can ride over one or more of the ridges between adjacent grooves 121, permitting the plunger 120 to advance, and restoring tension to the chain 2 by acting through movable guide 3. When the force urging the plunger in the advancing direction force is small, the annular portion R1 does not move from one groove 121 to a next groove. In this case, advancing movement of the plunger is limited by the distance through which the annular portion R1 can ride radially outward on surface 122.

When tension of the chain 2 increases, a reaction force acts on the plunger 120 urging the plunger in the retracting direction. The annular portion R1 prevents retracting movement of the plunger 120 by engaging a rearward-facing surface 123, which has a steeper slope than that of the forward-facing surface 122. Thus, the grooves 121 and the elastic ring R compose a ratchet mechanism.

The manipulation elements 150 and 160 have counterface portions 151 and 161, which are is separated in the circumferential direction respectively from wall surfaces 145 and 146 of the cut-out portion 140, forming voids C1 and C2.

As shown in FIGS. 2 and 3, bent portions 154 and 164 are formed by bending parts of the manipulation elements 150 and 160 that are situated outside the cut-out portion 140 so that they extend substantially parallel to the axial direction. Straight portions 155 and 165 connect the annular portion R1 respectively with bulged parts 152 and 162 of the counterface portions 151 and 161.

When the elastic ring R is accommodated in the ring-accommodating groove 130 and the cut-out portion 140, the counterface portions 151 and 161 respectively face circumferential wall surfaces 145 and 146 of the cut-out portion 140, with the peaks 152*b* and 162*b* of the bulged portions being the parts of the bulged portions closest to the wall surfaces of the cut-out portion. The peaks of the bulged portions are connected by gradually inclined parts 152*a* and 162*a* to straight portions 153 and 163, which extend outward through the opening of the cut-out portion. The inclined portions 152*a* and 162*a* may be straight or curved.

As seen in FIGS. 2 and 3, the bent portions 154 and 164 are located closer than peaks 152*b* and 162*b* of the bulged parts to axial plane P1*a*.

As shown in FIGS. 4 and 5, the bulged parts 152 and 162 are shaped so that when a manipulation tool T is moved into A void C1 while in contact with A bulged part 152 and a wall surface 145 the ring rotates and counterface portion 151 (FIG. 3) moves in direction A1 (FIG. 5) while counterface portion 161 comes into engagement with wall portion 146. Further insertion of the manipulation tool then causes the ring to expand to the condition shown in FIG. 5, in which the ring is clear of the groove in which it was situated on the plunger. The plunger is then free to move in the advancing direction. In a similar manner, insertion of the manipulation tool into the void C2 causes the ring to rotate in the opposite direction until its counterface portion 151 comes into engagement with wall portion 145, after which, on further insertion of the tool, the ring expands, clearing the groove in which it was situated on the plunger.

The outward-extending portions 153 and 163, which beyond the outer ends of wall surfaces 145 and 146, are capable of guiding the manipulation tool T to the bulged parts 152 and 162 along a direction parallel to axial plane P1a.

As shown in FIGS. 1 and 2, voids C1 and C2 have widths W1 and W2, respectively, and their outer end portions C1a and C2a have widths W1a and W2a, which are larger than the width Tw of the manipulation tool T (FIG. 4) so that manipulation tool T can be inserted into the voids.

Although, in the embodiment shown, the voids C1 and C2 are both of a size such as to enable insertion of the manipulation tool, in alternative embodiments these voids may be formed so that only one of the outer end widths W1a and W2a is larger than the width Tw of the manipulation tool T.

The first and second bent portions extend in opposite directions parallel to the axial line L1. As shown in FIG. 2, each of these bent portions crosses a plane P2a, which is orthogonal to the axial line L1 and to which the annular portion R1 is symmetrical.

The first and second straight portions 155 and 165 overlap at location B when viewed from the axial direction as in FIG. 3, but are in the same radial position. These portions are in contact with each other and extend in parallel relationship to each other within the cut-out portion 140. When the manipulation elements 150 and 160 move toward each other so that the annular portion R1 expands, these first and second straight portions 155 and 165 slide on each other in a nearly straight condition.

As shown in FIG. 2, the first straight portion 155 is inclined in the advancing direction with respect to plane P2a from the annular portion R1, while the second straight portion 165 is inclined in the retracting direction with respect to plane P2a from the annular portion R1.

The manipulation elements 150 and 160 of the elastic ring R are formed in a shape such that they exhibit substantial rotational symmetry through 180° with respect to a specific straight line L2 (center of FIG. 2). That is, if the manipulation elements 150 and 160 are rotated around line L2 by 180°, they overlap respectively the original positions of elements 160 and 150, and the ring R substantially overlap the original position of ring R before the rotation.

As shown in FIGS. 2 and 3, the wall surfaces 145 and 146 have inclined surfaces 145b and 146b at the opening of the cut-out, so that the widths W1 and W2 of the voids C1 and C2 increase proceeding outward in the cut-out. The inclined surfaces 145b and 146b are either planar or curved surfaces that extend to outer end portions 145a and 146a of the wall surfaces.

In maintaining a camshaft driven by the transmission 1, the manipulation tool T can be inserted through a small maintenance hole provided in a timing chain cover and into one of voids C1 and C2. In FIG. 4, the tool is shown inserted into void C1. The tool is first placed into contact with the extending portion 153 as shown in FIG. 4. When inserted, the tool also comes into contact with the wall surface 145b, which serves as a guide surface.

As the tool T is inserted further along the extending portion 153 it comes into contact with the first bulged part 152 and wall surface 145 as shown in FIG. 5. As the tool T moves along the inclined portion 152a (FIG. 3) of the manipulation element 150, the manipulation element 150 moves in direction A1 (FIG. 5), and the second bulged part 162 comes into contact with wall surface 145. Then, the annular portion R1 expands to its engagement releasing condition, in which its inner diameter exceeds the maximum outer of a groove 121, so that the plunger 120 can be moved axially in the retracting (or "setback") direction shown in FIG. 1.

After setting back the plunger 120 to a predetermined setback position, the manipulation tool T is pulled out, and the annular portion R1 engages another groove 121 and the adjustment of the position of the plunger 120 is completed.

In the assembly of the tensioner, the ring can be expanded by a manipulation tool in the same manner as describe above, so that the plunger 120 can be inserted into the plunger-accommodating hole 103 of the housing 101.

The manipulation tool T may be inserted into the void C2 as indicated by the broken line in FIG. 4. Because the manipulation tool T can be inserted into either one of voids C1 and C2 to expand the annular portion R1, assembly of the tensioner and maintenance of the transmission are facilitated.

Because of the configuration of the manipulation elements of the ring, it is unnecessary to pinch the manipulating portion R2 by means of a pinching tool, and it is unnecessary to provide a special tool for insertion between a pair of manipulation elements. Consequently, the installation of the plunger 120 into the housing 101 becomes easier, and expanding the annular portion R1 by access through a small hole in a timing chain cover or other enclosure is also made easier so that maintenance of the chain transmission and related components is also facilitated.

The extending portions 153 and 163 of the ring can be utilized to guide the manipulation tool toward the bulged parts even when the outer end widths W1a and W2a of the cut-out portion of the tensioner housing exceed the width of the manipulation tool. Therefore, the ring can be expanded easily and assembly of the tensioner and maintenance of the transmission and other machinery in which the tensioner is utilized are facilitated.

In the overlapping portion B of the ring the first and second straight portions 155 and 165 are in contact with each other and extend in parallel, and slide against each other in a nearly straight condition when the manipulation elements 150 and 160 move toward each other to expand the annular portion R1. The straight condition of the first and second straight portions 155 and 165 is maintained deflection at the overlapping portion B is prevented when the manipulation tool is used, and even when the bent portions 154 and 164 of the manipulation elements 150 and 160, are pinched toward each other by using a pinching tool.

The aforementioned deflection-preventing effect is enhanced because the bent portions 154 and 164 cross the manipulating portion R2 (FIG. 2) in the axial direction and can be pinched by the pinching tool at a position intersected by the radial plane P2a.

Furthermore, because the overlapping portion B is large in the circumferential direction of the annular portion R1, it is possible to reduce instances of entanglement of elastic rings R with one another in a part feeder.

The inclined parts 145b and 146b of the wall surfaces of the cut-out in the housing facilitate the insertion of the manipulation tool T into the voids C1 and C2 especially when the manipulation tool T is inserted through the small maintenance hole. These inclined wall surfaces 145b and 146b also cause the manipulation tool T to come into contact with an extended portion 153 or 163 of the ring, thereby facilitating expansion of the annular portion R1.

Because the manipulation elements 150 and 160 have substantial rotational symmetry through 180° with respect to line L2, and substantially the same shape on the front and back of the elastic ring R, it becomes easy to supply the elastic rings R by a part feeder and it becomes possible to automate the installation of the elastic ring R into the ring-accommodating groove 130 of the housing 101 and the cut-out portion 140 of the tensioner housing.

Figure 6:
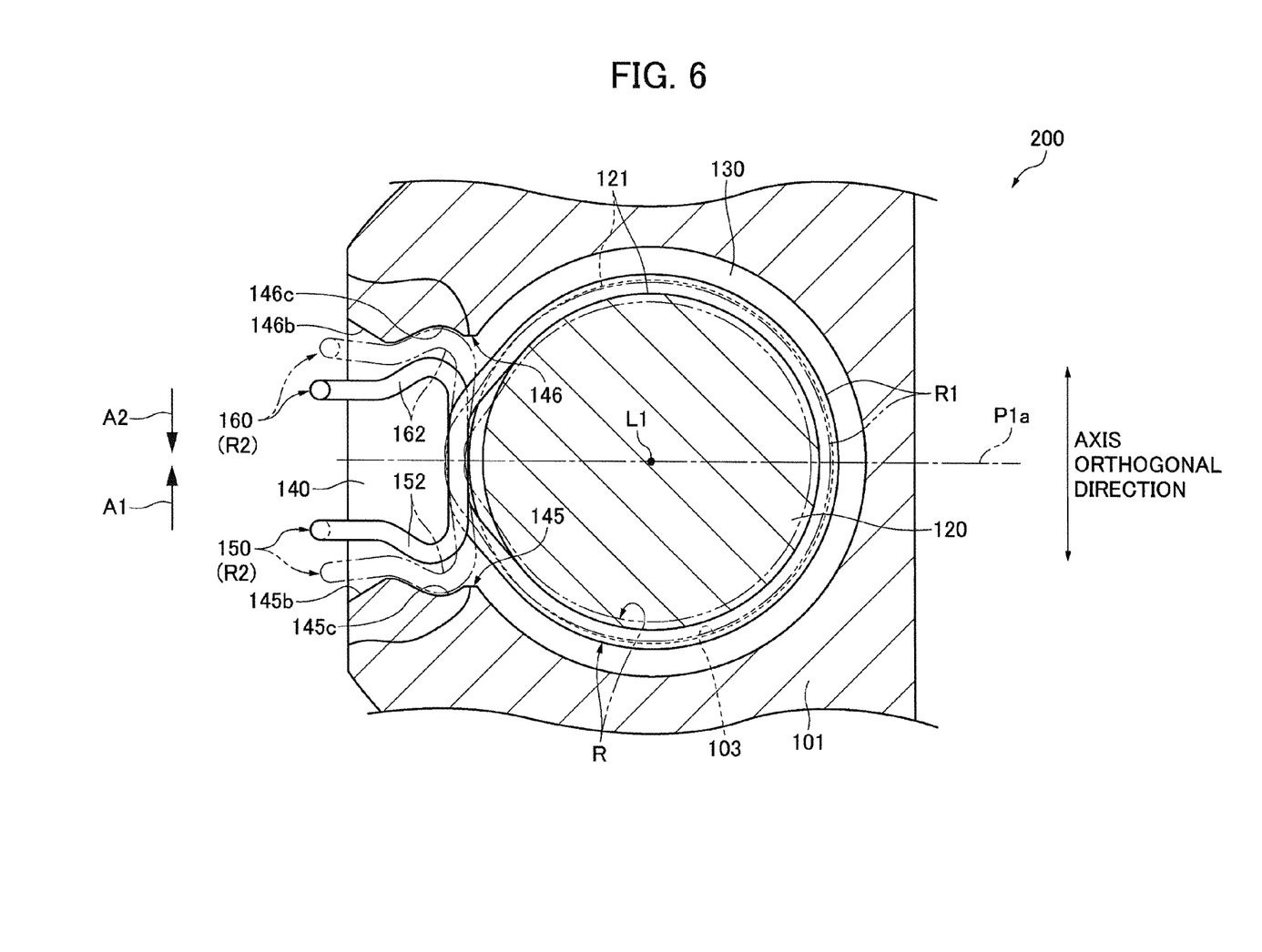
FIG. 6 is a sectional view, corresponding to FIG. 3, showing a second embodiment of the invention.

In the embodiment shown in FIG. 6, the circumferential wall surfaces 145 and 146 have concave portions 145c and 146c into which the bulged parts 152 and 162 move as the manipulation elements 150 and 160 become more distant from each other within the cut-out portion 140, i.e., as they move in a direction opposite from the direction in which they move to expand the elastic ring. The concave portions 145c and 146c extend substantially in parallel with the axial direction from the end surface 102 (FIG. 2) of the tensioner housing, and are formed substantially a shape complementary to that of the bulged parts 152 and 162, i.e., into a shape in which regions facing with each other have substantially the same shape, the shape being generally an arc-like shape in the embodiment shown. The concave portions 145c and 146c are positioned to receive the bulged portions of the manipulation elements of the ring even when the ring is contracted to a condition in which its outer diameter is smaller than the inner diameter of the ring-accommodating groove 130 in the wall of the plunger-accommodating hole, as illustrated by the broken lines in FIG. 6.

In the embodiment of FIG. 6, because the concave portions allow the ring to be contracted to a dimension such that it can clear the ring-accommodating groove 130, it is possible to install the elastic ring R, including its bulged parts 152 and 162, into the housing 101 without inclining the ring R. Installation is achieved by spreading the manipulation elements 150 and 160 apart to contract the ring, and sliding the ring into the plunger-accommodating hole while passing the bulged parts through the concave parts of the cut-out portion of the housing. Thus, it is possible to install the elastic ring R into the housing 101 efficiently. It is also possible to automate the manufacture and installation of the elastic ring R so that further gains in efficiency can be realized.

It is not necessary to enlarge the cut-out portion 140 in the circumferential direction to accommodate the bulged parts 152 and 162. Accordingly, it is possible for the ring-accommodating groove to block axial movement of the annular portion R1 reliably.

Figure 7:
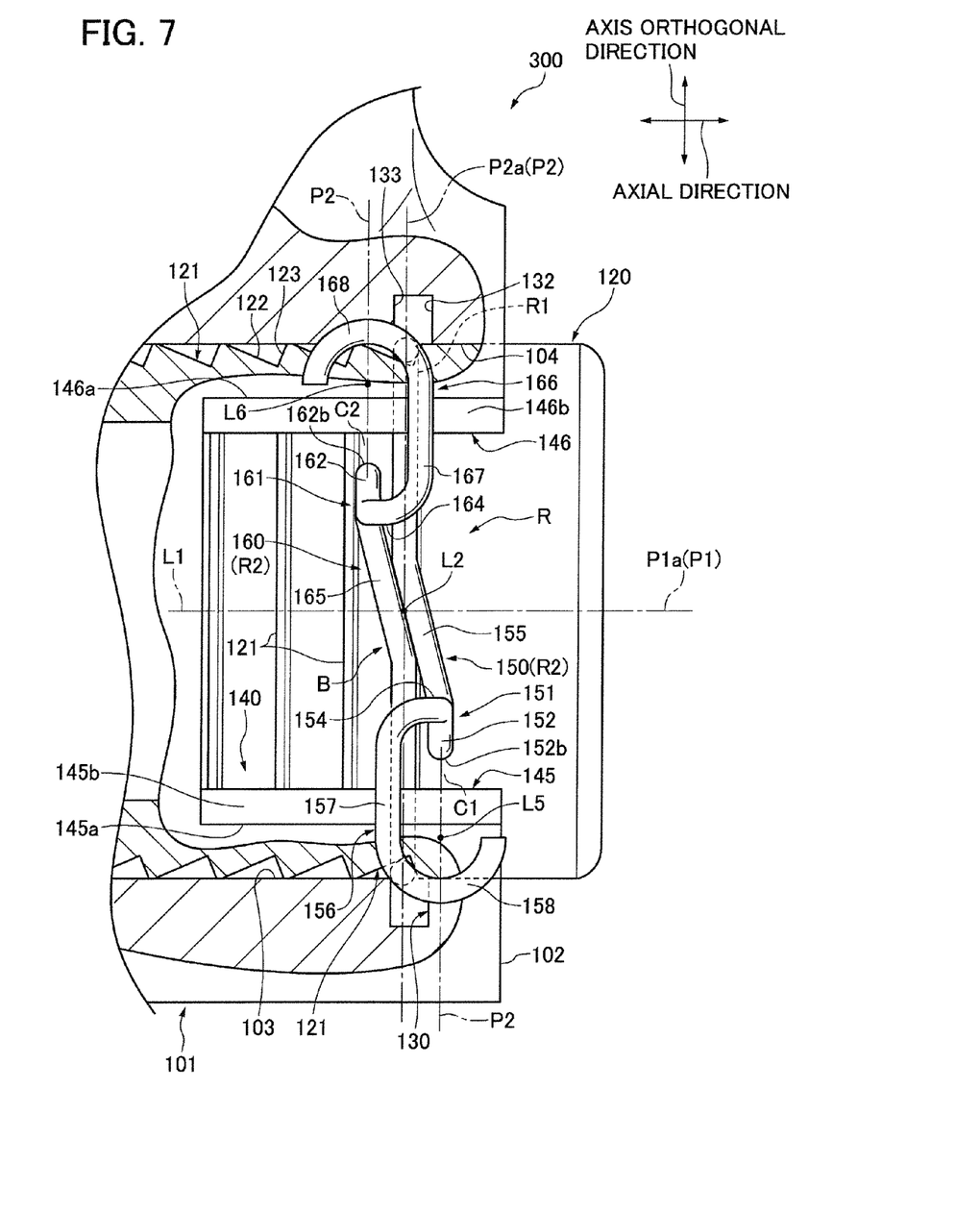
FIG. 7 is a sectional view, corresponding to FIG. 2, showing a third embodiment of the invention.
Figure 8:
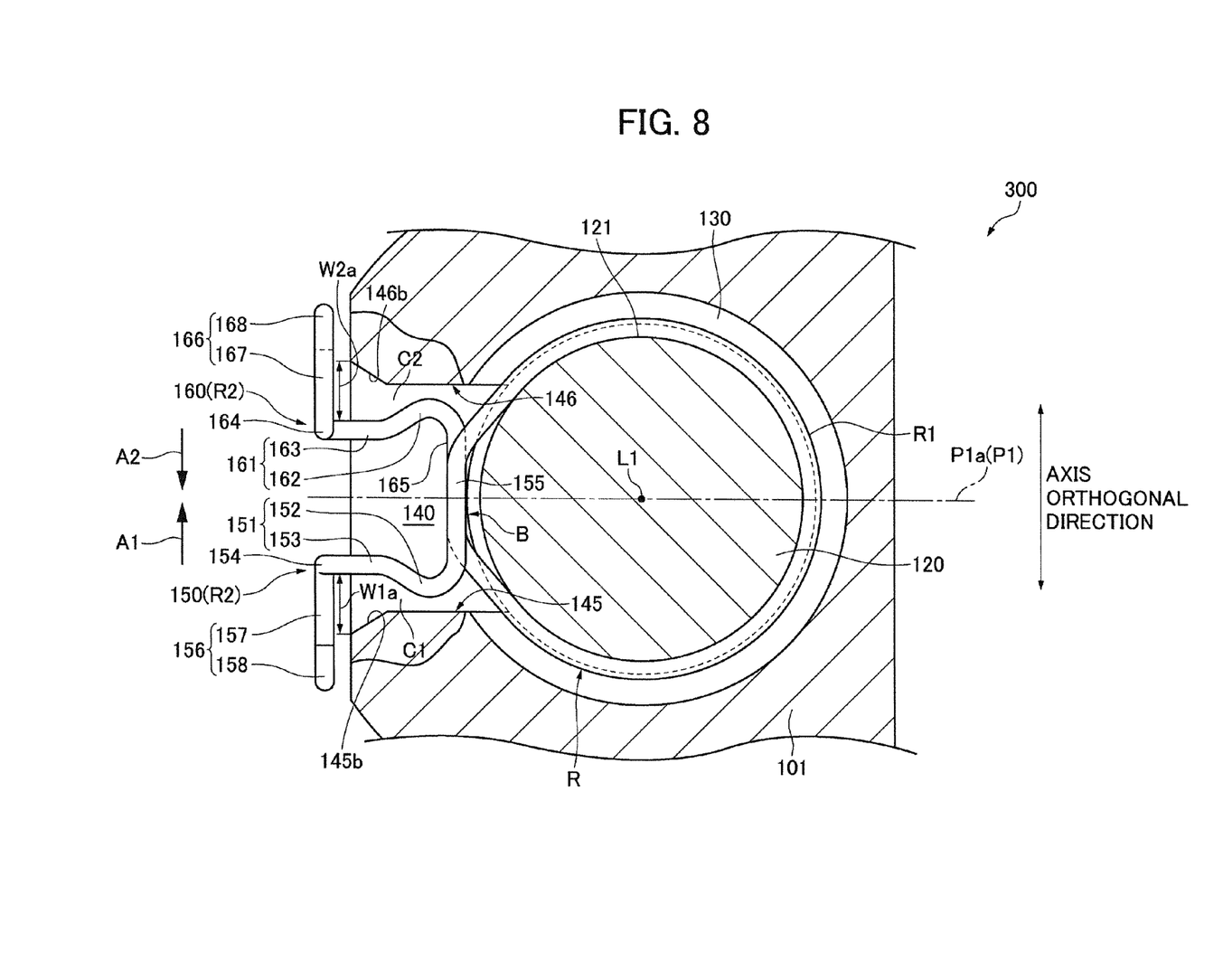
FIG. 8 is a sectional view, corresponding to FIG. 3, showing the third embodiment of the invention.

As shown in FIGS. 7 and 8, in a tensioner 300, a pair of manipulation elements 150 and 160 can have holding portions 156 and 166 for holding the manipulation tool T by engaging the manipulation tool T when it is inserted between bulged part 152 and a circumferential wall surface 145, or between bulged part 162 and a circumferential wall surface 146. The first and second holding portions 156 and 166 have arm portions 157 and 167 that extend away from axial plane P1a from the bent portions 154 and 164, and concave, substantially arc-shaped, receiving portions 158 and 168 that continue from the arm portions 157 and 167.

The first and second receiving portions 158 and 168 face respectively the bent portions 154 and 164, and are generally semicircular, the sides facing the bent portions being the concave sides. Centers L5 and L6 of the receiving portion 158 and 168, as shown in FIG. 7, are located on the plane P2 that intersect the bulged parts 152 and 162.

Figure 11:
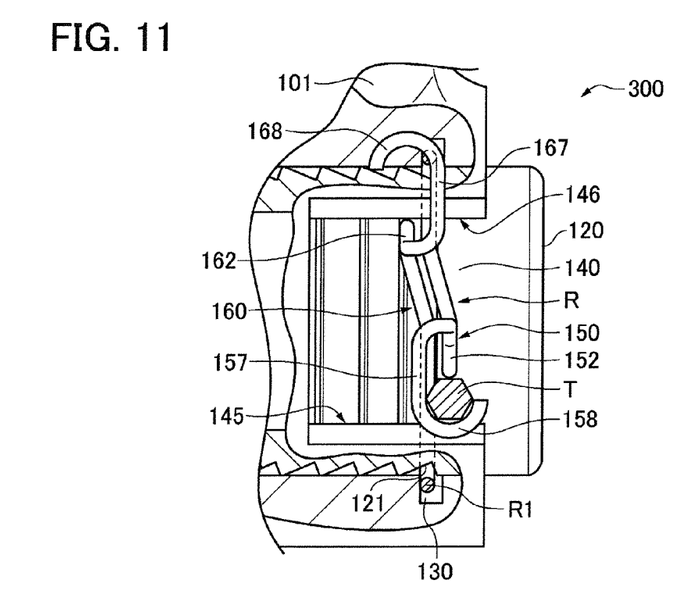
FIG. 11 is a sectional view, corresponding to FIG. 2, illustrating a second stage in the expansion of the diameter of the elastic ring.
Figure 12:
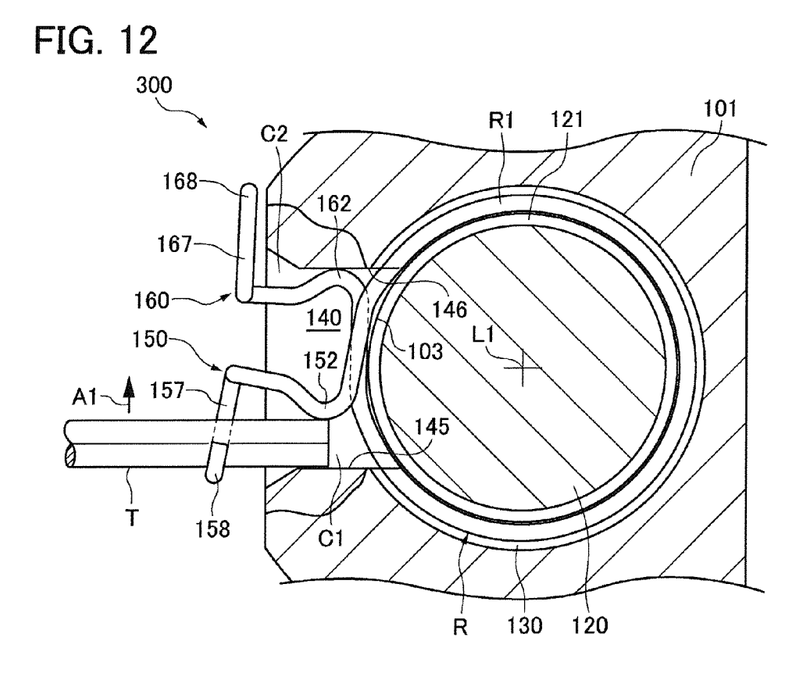
FIG. 12 is a sectional view corresponding to FIG. 3, illustrating a second stage in the expansion of the diameter of the elastic ring.

The receiving portions 158 and 168 are located at positions intersecting the plane P2, which is orthogonal to axis L1. Each of these receiving portions has a shape such that it partially surrounds the manipulation tool T as shown in FIGS. 11 and 12. Each receiving portion is positioned so that the axial position of a radial projection of its adjacent bulged portion is approximately mid way between the opposite sides of the receiving portion.

The receiving portion 158 and 168 prevent the manipulation tool T from tilting by engaging and supporting the manipulation tool T when it is inserted between the bulged parts 152 and 162 and the circumferential wall surfaces 145 and 146. Because each receiving portion is positioned so that the axial position of a radial projection of its adjacent bulged portion is approximately mid way between the opposite sides of the receiving portion, even if the manipulation tool T is tilted in the axial direction, it can be engaged reliably with the receiving portion 158 and 168 and inserted between the bulged part 152 or 162 and the wall surface 145 or 146 such a way as to expand the ring reliably.

Because the first and second arm portions 157 and 167 are linear straight portions substantially parallel to the bulged parts 152 and 162 and at a predetermined axial position relative to the bulged parts when viewed from a radial direction, it is possible to insert the manipulation tool T between the bulged part 152 or 162 and a circumferential wall surface 145 or 146 by moving the tool inward while in contact with the arm portions 157 or 167. The holding portions 156 and 166 do not prevent the bulged parts 152 and 162 from moving in the ring-expanding direction even after when the bulged parts 152 and 162 start to move in the ring-expanding direction. Thus, the manipulation tool T can be positioned between the bulged part 152 or 162 and the wall surface 145 or 146.

Figure 9:
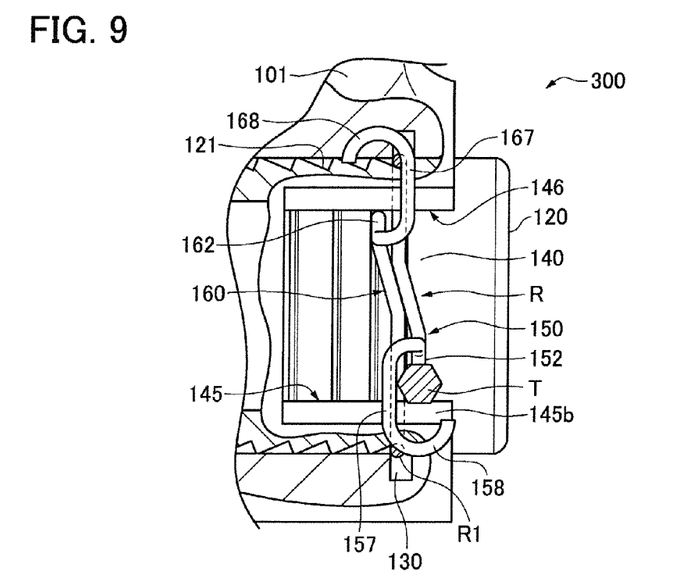
FIG. 9 is a sectional view, corresponding to FIG. 2, illustrating a first stage in the expansion of the diameter of the elastic ring.
Figure 10:
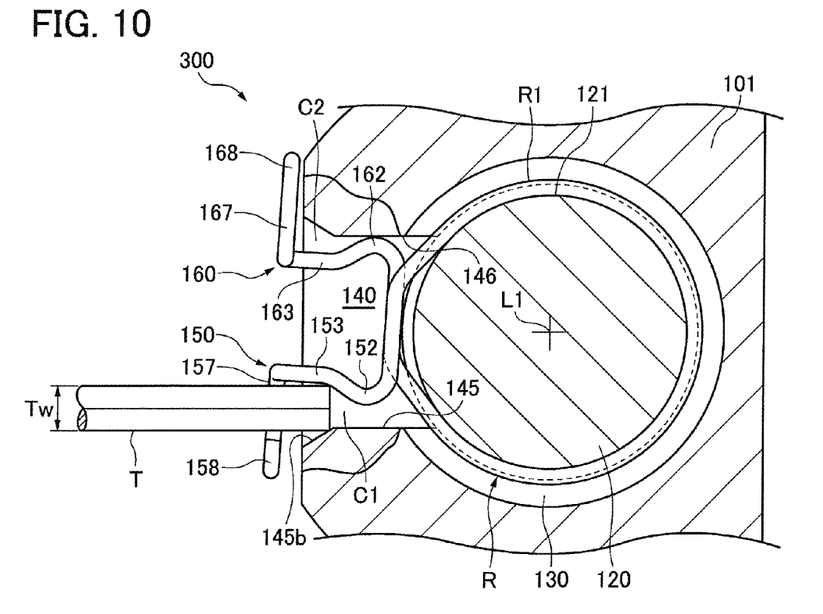
FIG. 10 is a sectional view corresponding to FIG. 3, illustrating a first stage in the expansion of the diameter of the elastic ring.

When the manipulation tool T is inserted into the void C1, for example as shown in FIGS. 9 and 10, through a maintenance hole, the manipulation tool T crosses the arm portion 157 while in contact with the arm portion 157 of the holding portion 156.

After coming into contact with the first bulged part 152 and the wall surface 145 in the direction, the manipulation tool T is pushed in further while being guided along the inclined part of the bulged portion 152. Then, the manipulation element 150 moves in the direction to expand the ring and the second bulged part 162 comes into contact with wall surface 146. As shown in FIGS. 11 and 12, the annular portion R1 expands to an engagement-releasing condition, in which it clears groove 121, and the plunger 120 can be moved axially in the retracting (setback) direction.

When the annular portion R1 expands, the manipulation tool T is held by the receiving portion 158 in the condition in which the manipulation tool T is inserted between the bulged part 152 and the wall surface 145, and tilting of the manipulation tool T is suppressed.

After the plunger 120 is set back to the desired position, the manipulation tool T is pulled out of the void C1 and the manipulation element 150, and the adjustment of the position of the plunger 120 is completed.

The plunger 120 may be installed in the plunger-accommodating hole 103 by expanding the annular portion R1 in the same manner using the manipulation tool T.

In the assembly of the tensioner, the manipulation tool T may be inserted into the void C2 instead of into the void C1 in the same manner and with essentially the same result as described above. Depending on the position of the maintenance access hole the tool T may also be inserted into void C2 to release the plunger for maintenance of the chain transmission or related machine elements.

With this arrangement, after the annular portion R1 is expanded, the manipulation tool T is held by the manipulation elements 150 and 160, so that an operator is not required to hold the manipulation tool T continuously to maintain the annular portion R1 in its expanded condition As indicated by the broken lines in FIG. 3, the wall surfaces 145 and 146 need not have the inclined surfaces 145b and 146b. In another modification, the bulged part may be provided on the wall surface of the cut-out portion of the tensioner housing instead of on the counterface portion of a manipulation element. In still another modification, the bulged portion may be provided on both the counterface portion of a manipulation element and on the opposing wall surface of the cut-out portion.

The flexible transmission medium to which tension is applied by the tensioner can be a chain or any form of endless belt. Moreover the tensioner of the invention can be utilized not only in engine timing transmissions, but also for power transmission in other kinds of machines such as industrial machinery.

What is claimed is:

1. A ring-type tensioner comprising:
   a housing having an end surface and a plunger-accommodating hole with an opening in said end surface, the plunger-accommodating hole having a longitudinal axis;
   a plunger protruding from said plunger-accommodating hole and slidable along said axis in a protruding direction and in a retracting direction opposite to said protruding direction, whereby the plunger can maintain tension in an endless flexible transmission medium in a transmission;
   means for biasing the plunger in said protruding direction;
   a circumferential ring-accommodating groove in a wall of the plunger-accommodating hole;
   a cut-out portion in the housing that extends axially from said end surface to the ring-accommodating groove, said cut-out portion having opposed, circumferentially facing, wall surfaces; and
   an elastic ring disposed in the ring-accommodating groove and the cut-out portion and surrounding the plunger;
   the elastic ring having an annular portion disposed in the ring-accommodating groove, and a manipulating portion continuous with the annular portion and disposed at least in part in the cut-out portion, said manipulating portion being operable by a manipulation tool to expand or contract the annular portion; and wherein:
   the plunger has a set of external circumferential grooves, each of said external circumferential grooves being engageable by said annular portion of the elastic ring to restrict axial movement of said plunger;
   the manipulating portion of the ring is composed of manipulation elements with counterface portions that are disposed respectively in facing relationship with, and spaced from said opposed circumferentially facing wall surfaces of the cut-out portion whereby a gap is formed between each said wall surface and a counterface portion of one of said manipulation elements;
   the ring is configured so that, when said gaps are enlarged, said annular portion can expand to a condition in which its internal diameter is larger than the maximum diameter of the external circumferential grooves of the plunger whereby the annular portion clears the external circumferential grooves thereby releasing the plunger for axial movement in said retracting direction;
   at least one of each counterface portion and its opposed wall portion has a bulged part;
   the bulged parts are shaped such that, proceeding in an inward direction toward the plunger, each bulged part gradually bulges in the circumferential direction whereby a manipulation tool that is moved inward through one of said gaps toward said plunger while in contact with a bulged part moves the counterface portion of a manipulation element in a direction to cause the annular portion of said ring to expand; and
   the manipulation elements have holding portions for holding a manipulation tool by engaging the manipulation tool when the tool is inserted into said gaps.

2. The ring-type tensioner according to claim 1, wherein each of said manipulation elements includes a portion extending outward through said opening in said end surface of the housing, whereby said outward extending portion can guide a manipulation tool toward a bulged part in one of said gaps.

3. The ring-type tensioner according to claim 2, wherein said bulged parts are formed in said manipulation elements, and said wall surfaces of the cut-out in said housing have concave portions which the bulged parts can enter when the annular portion is contracted to a condition in which it clears the ring-accommodating groove.

4. The ring-type tensioner according to claim 3, wherein the manipulation elements are disposed on opposite sides of an imaginary straight line that extends through said cut-out portion in the housing and intersects said longitudinal axis of the plunger-accommodating hole perpendicularly, and wherein each of said manipulation elements is shaped so that, if the elastic ring were repositioned by rotation through 180° about said imaginary straight line, each of said manipulation elements would occupy the position originally occupied by the other of said manipulation elements and would have the same orientation as the original orientation of said other of said manipulation elements.

5. The ring-type tensioner according to claim 2, wherein:
   the manipulation portion is composed of first and second manipulation elements;
   said bulged portions are formed respectively in said first and second manipulation elements;
   the first and second manipulation elements have first and second straight portions that connect the annular portion of the ring with the bulged parts, said straight portions extending in tangential relation to the circumferential direction of the annular portion;
   the first and second straight portions are in substantially parallel relationship, in contact with each other, and in overlapping relationship when viewed in a direction parallel to said axis; and
   the first and second straight portions can slide relative to each other when the manipulation elements are moved in a direction to expand said annular portion of the ring.

6. The ring-type tensioner according to claim 1, wherein said wall surfaces have inclined surfaces adjacent the opening of the cut-out portion of the housing, whereby the circumferential width of the cut-out becomes greater proceeding outward from the interior thereof toward said opening.

* * * * *